Nov. 27, 1928.
L. SPENCER
1,693,556
SPRINKLING SYSTEM
Filed May 14, 1927
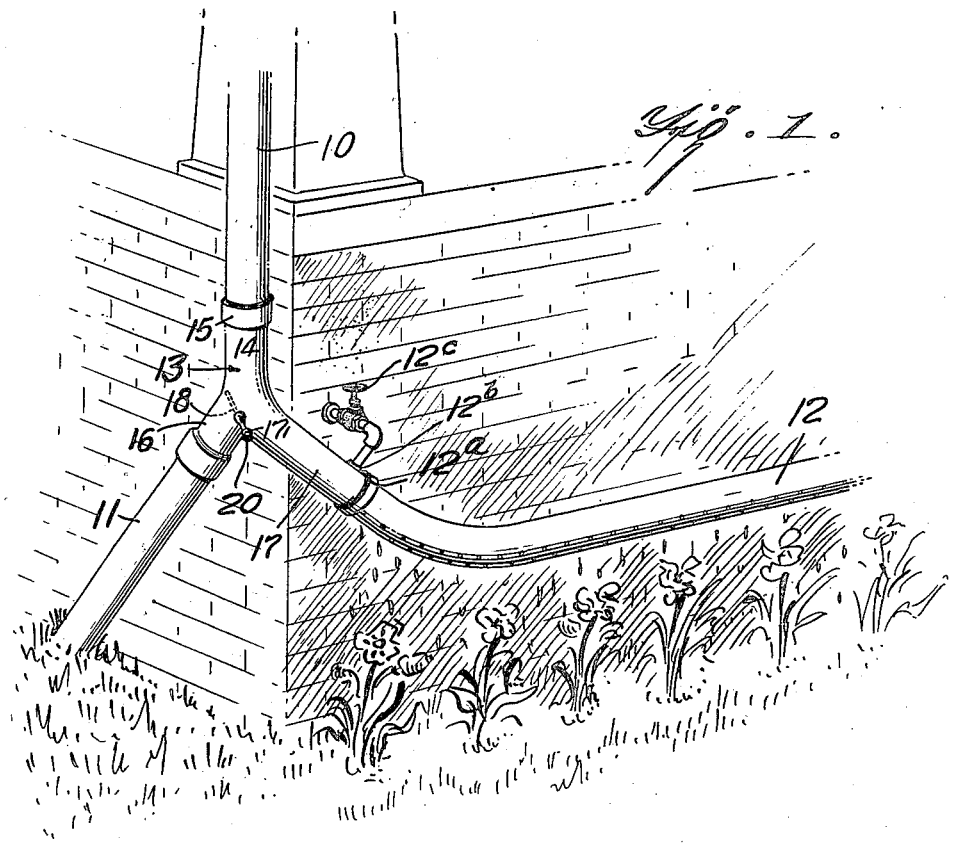
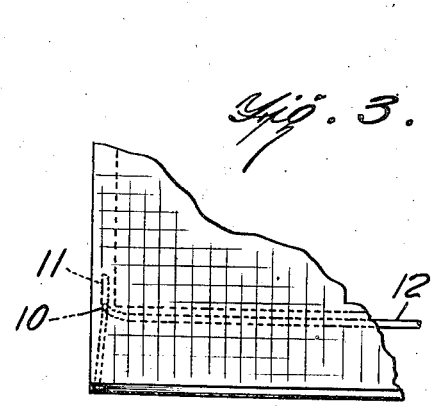
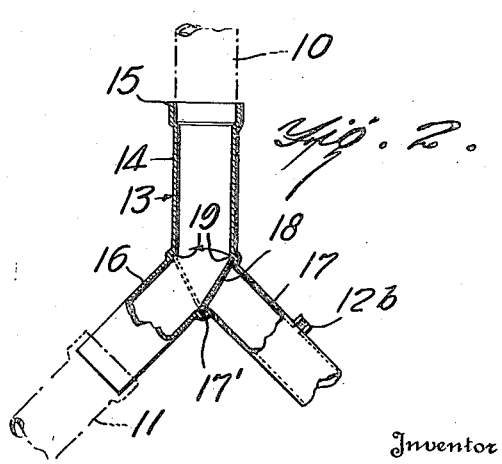
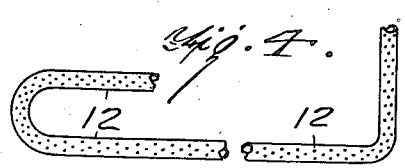
Inventor
LENORA SPENCER,
Attorney Patented Nov. 27, 1928.

1,693,556

UNITED STATES PATENT OFFICE.

LENORA SPENCER, OF HOT SPRINGS NATIONAL PARK, ARKANSAS.

SPRINKLING SYSTEM.

Application filed May 14, 1927. Serial No. 191,348.

My invention relates to a water sprinkling device adapted for use in connection with flower beds or the like, located along the house in such a position as to assist its receiving the benefit of the rainfall, one of the objects being to provide a very small device which may be readily placed in its operative position with a minimum amount of expense. The scope of my invention extends to whatever constructions may be defined by or included within the terms or language of the appended claim.

In the drawings:

Figure 1 is a view in perspective illustrating my improved sprinkling device adjacent to a flower bed.

Figure 2 is a side elevation of the valve associated with my invention, parts being broken away, Figure 3 is a somewhat diagrammatic view of the portion of the lawn showing the location of the sprinkler pipe with respect to it, and Figure 4 is a somewhat diagrammatic view showing another form of the sprinkler pipe.

My invention in the form or embodiment shown in the drawing and briefly described comprises a rain or down spout, 10, a soil pipe, 11, which of course passes downward and connects with the sewer pipe in the usual manner, the sprinkler pipe, 12 and a connecting portion, 13 which is interposed between the pipes 10, 11 and 12.

The connecting member, indicated generally as at 13, preferably has the form of an inverted Y, that is to say a tubular portion, 14, which is vertically extending and provided at its upper end with an enlarged sleeve portion, 15, and is adapted to receive the lower end of the rain or down spout, 10. The member, 13, is provided at its lower ends with a pair of angularly disposed and downwardly extending tubular legs, 16 and 17. Although this member, 13, may be built up of several tubular sections of sheet metal yet it may be formed of a single casting.

A horizontally extending pivot, 17', is located at a suitable point preferably at the juncture of the tubular legs, 16 and 17, as clearly shown in Figure 2, for the purpose of mounting a deflector or valve plate, 18. The upper edge of this valve plate, 18, is preferably adapted to seat in the recesses, 19, formed in the central portions of the member, 13. A hand operated handle, 20, may be secured to the shaft, 18, in any desired manner.

As shown in the accompanying drawing, horizontal sprinkling pipe, 12, is formed with an upwardly extending portion 12$^a$, which is adapted to connect with the leg, 17, of the member 13. The horizontal pipe, 12, is of course provided with openings on the lower side thereof of sufficient diameter and relatively spaced as to provide the best results for the particular use.

It is to be understood, of course, that the sprinkler pipe, 12, may be made to conform to the adjacent portion of the house or porch or any other desired shape so as to produce the desired result.

For the purpose of utilizing my improved sprinkling device during a drought, or independent of rainfall, I employ a water inlet pipe from within the house and locate it in the portion, 12$^a$, of the sprinkler pipe, 12, as is clearly shown in Figures 1 and 2. This is accomplished by means of a relatively small threaded member, 12$^b$, which is suitably located upon the section, 12$^a$. The hand operated valve, 12$^c$, may be located either on the inside of the house or on the outside as desired.

Frequently, it is convenient to employ a hydrant or like water supply in connection with the supplemental water inlet pipe, which may, of course, be connected in any suitable manner.

Should I find it desirable to draw the water from the rain spout, 10, directly into the sewer through the soil pipe, 11, it is merely necessary to move the valve plate, 18, as is shown in full lines in Figure 2, whereas should I find it desirable to draw the water into the sprinkler pipe, 12, the valve plate, 18, is moved as shown in dotted lines in Figures 1 and 2.

In order to sprinkle the flower bed effectively it may be desirable to form the sprinkler pipe, 12, in various shapes, or for example as indicated in Figure 4.

What I claim is:

In a sprinkler system, the combination with a rain-water receiving down spout, a soil pipe connected thereto, a sprinkler connected to the spout adjacent its connection with the soil pipe, a manually controlled valve within the connection between the down spout, soil pipe and sprinkler for directing the rain water from the spout into either the soil pipe or sprinkler, and a separate water supply connected to the sprinkler, and a valve for controlling said water supply connection.

LENORA SPENCER.